(12) United States Patent
Mapes et al.

(10) Patent No.: US 6,617,507 B2
(45) Date of Patent: Sep. 9, 2003

(54) PHOTOVOLTAIC ARRAY

(75) Inventors: Donald R. Mapes, Glendale, AZ (US); Larry G. Crosser, Perrysburg, OH (US); James B. Foote, Toledo, OH (US); Benjamin L. Richie, Jr., Scottsdale, AZ (US)

(73) Assignee: First Solar, LLC, Perrysburg, OH (US)

( * ) Notice: Subject to any disclaimer, the term of this patent is extended or adjusted under 35 U.S.C. 154(b) by 0 days.

(21) Appl. No.: 09/993,875

(22) Filed: Nov. 16, 2001

(65) Prior Publication Data

US 2003/0094193 A1 May 22, 2003

(51) Int. Cl.[7] .............................................. H01L 31/048
(52) U.S. Cl. ........................ 136/251; 136/244; 257/433; 126/623; 126/621; 52/173.3
(58) Field of Search ................................. 136/251, 244; 257/433; 126/623, 621; 52/173.3

(56) References Cited

U.S. PATENT DOCUMENTS

| | | | |
|---|---|---|---|
| 3,769,091 A | | 10/1973 | Leinkram et al. |
| 4,040,867 A | | 8/1977 | Forestieri et al. |
| 4,114,595 A | * | 9/1978 | Barker ........................ 126/648 |
| 4,189,881 A | | 2/1980 | Hawley |
| 4,263,896 A | * | 4/1981 | Zebuhr ........................ 126/623 |
| 4,321,416 A | | 3/1982 | Tennant |
| 4,336,413 A | | 6/1982 | Tourneux |

(List continued on next page.)

FOREIGN PATENT DOCUMENTS

| | | |
|---|---|---|
| DE | 3247469 A1 | 7/1984 |
| DE | 3611542 A1 | 10/1987 |
| DE | 3611542 | 10/1987 |
| EP | 0905795 | 3/1999 |
| JP | 59-175168 A | 10/1984 |
| JP | 59-175169 A | 10/1984 |
| JP | 03-200376 A | 9/1991 |
| JP | 05-280168 A | 10/1993 |
| JP | 11-311002 | 11/1999 |

OTHER PUBLICATIONS

Photovoltaic Systems Design Assistance Center, "The Design of Residential Photovoltaic Systems vol. 4: The Array Design," pp. 5–13, Dec. 1988 *Sandia National Laboratories*, Albuquerque, NM.

(List continued on next page.)

*Primary Examiner*—Alan Diamond
(74) *Attorney, Agent, or Firm*—Fish & Richardson P.C.

(57) ABSTRACT

A photovoltaic array (20, 20') includes a plurality of elongated rails (28) each of which has a lower base (30) and an upper cap (32) of an extruded resin construction defining a pair of grooves (36) that open in opposite directions from each other to receive edges 36 of rectangular photovoltaic modules (22) so as to provide mounting thereof on a support surface (20, 24). The photovoltaic modules (22) are arranged in pairs (38) with the modules of each pair abutting each other and with each pair of modules being spaced along the elongated lengths of the rails from each adjacent pair of modules to provide openings (40) therebetween. Cross members (42) extend between the lower bases (30) of the rails to space the rails from each other and have upwardly opening shapes that receive electrical wiring (44).

27 Claims, 7 Drawing Sheets

U.S. PATENT DOCUMENTS

| | | | |
|---|---|---|---|
| 4,389,533 A | | 6/1983 | Ames |
| 4,426,999 A | * | 1/1984 | Evans et al. ............... 126/669 |
| 4,594,470 A | | 6/1986 | Headrick |
| 4,674,244 A | | 6/1987 | Francovitch |
| 4,677,248 A | | 6/1987 | Lacey |
| 4,760,680 A | | 8/1988 | Myers |
| 4,835,918 A | | 6/1989 | Dippel |
| 4,860,509 A | | 8/1989 | Laaly et al. |
| 4,886,554 A | | 12/1989 | Woodring et al. |
| 4,907,915 A | | 3/1990 | Nicholson et al. |
| 4,936,063 A | | 6/1990 | Humphrey |
| 4,937,990 A | | 7/1990 | Paquette |
| 4,966,631 A | | 10/1990 | Matlin et al. |
| 5,092,939 A | | 3/1992 | Nath et al. |
| 5,112,408 A | | 5/1992 | Melchior |
| 5,143,556 A | | 9/1992 | Matlin |
| 5,164,020 A | | 11/1992 | Wagner et al. |
| 5,228,924 A | | 7/1993 | Barker et al. |
| 5,248,349 A | | 9/1993 | Foote et al. |
| 5,316,592 A | | 5/1994 | Dinwoodie |
| 5,338,369 A | | 8/1994 | Rawlings |
| 5,372,646 A | | 12/1994 | Foote et al. |
| 5,409,549 A | | 4/1995 | Mori |
| 5,460,660 A | * | 10/1995 | Albright et al. ............ 136/251 |
| 5,470,397 A | | 11/1995 | Foote et al. |
| 5,473,847 A | | 12/1995 | Crookston |
| 5,505,788 A | | 4/1996 | Dinwoodie |
| 5,524,401 A | | 6/1996 | Ishikawa et al. |
| 5,536,333 A | | 7/1996 | Foote et al. |
| 5,571,338 A | | 11/1996 | Kadonome et al. |
| 5,647,915 A | | 7/1997 | Zukerman |
| 5,651,226 A | | 7/1997 | Archibald |
| 5,653,222 A | | 8/1997 | Newman |
| 5,678,383 A | * | 10/1997 | Danielewicz ............... 52/775 |
| 5,746,839 A | | 5/1998 | Dinwoodie |
| 5,787,653 A | | 8/1998 | Sakai et al. |
| D408,554 S | | 4/1999 | Dinwoodie |
| 5,945,163 A | | 8/1999 | Powell et al. |
| 6,037,241 A | | 3/2000 | Powell et al. |
| 6,061,978 A | | 5/2000 | Dinwoodie et al. |
| 6,065,255 A | | 5/2000 | Stern et al. |
| 6,082,060 A | | 7/2000 | Bauer et al. |
| 6,111,189 A | | 8/2000 | Garvison et al. |
| 6,148,570 A | | 11/2000 | Dinwoodie et al. |
| 6,242,685 B1 | | 6/2001 | Mizukami et al. |
| 6,254,397 B1 | | 7/2001 | Elmer ........................ 439/6 |
| 6,269,596 B1 | | 8/2001 | Ohtsuka et al. |
| 6,291,761 B1 | | 9/2001 | Takada et al. |
| 6,294,723 B2 | | 9/2001 | Uematsu et al. |
| 6,295,818 B1 | | 10/2001 | Ansley et al. |
| 6,313,394 B1 | | 11/2001 | Shugar et al. |
| 6,331,671 B1 | | 12/2001 | Makita et al. |
| 6,360,491 B1 | | 3/2002 | Ullman |
| 6,369,315 B1 | | 4/2002 | Mizukami et al. |
| 6,410,843 B1 | | 6/2002 | Kishi et al. |
| 6,414,237 B1 | | 7/2002 | Böer |
| 6,437,235 B1 | * | 8/2002 | Komori et al. ............ 136/251 |

OTHER PUBLICATIONS

Miles C. Russell and Dr. Edward C. Kern, Jr., "PV Array Designs for Flat–Roof Buildings," pp. 1129–1133, 1993, *Twenty Third IEEE Photovoltaic Specialists Conference*.

H. Hullmann and K.P. Maass, "Photovoltaic House Supply for Decentralized Relief of Mains Supply," Photovoltaic Demonstration Projects, Proceedings of the third contractors' meeting organized by the Commission of the European Communities, May 18–20, 1988.

Edward C. Kern, Jr. et al., "Development and Evaluation of Solar Photovoltaic Systems: Final Report," pp. 1–312, A1–A20, Jun. 1983, Massachusetts Inst. of Technology, Lexington, MA.

Duetsche Gesellschaft für Luft et al., Photovoltaic Power Generation, Sep. 25–27, 1974, International Conference on Photovoltaic Power Generation, Hamburg.

Thomas L. Dinwoodie, et al., "Optimizing Roof–Integrated Photovoltaics: A Case Study of the PowerGuard Roofing Tile," pp. 1004–1007, Dec. 5–9, 1994, First WCPEC, IEEE.

J.C. Schaefer, Review of Photovoltaic Power Plant Performance and Economics, pp. 232–238, Jun. 1990, IEEE Transactions on Energy Conversion, vol. 5, No. 2.

Main Features of the TISO 10 kW m–Si, Page 1 of 1 file:// C\Documents20% and% 20Settings\Temporary%20Internet%20, Mar. 2001.

Christina Jennings et al., "PG&E Experience with a 10–kW Commercial Rooftop PV System," pp. 1501–1504, May 1996, $25^{th}$ PVSC, IEEE.

J. Berdner et al., "Siting, Installation, and Performance Issues for Commercial Roof–Mounted PV Systems," pp. 981–985, Dec., 1994, First WCPEC, IEEE.

Bruce M. Cross, "Development, Testing and First Installations of an Integrated Solar Roof System," pp. 1020–1023, Dec. 5–9, 1994, First WCPEC, IEEE.

Bruce M. Cross, "Roof Integrated Commercial PV Design," pp. 8/1–8/4, (1994), IEE, Savoy Place, London.

Solar Vision, Inc., Director of Publications: William Dunkerley, "Photovoltaic System Design," pp. 220–223, 240–241, 246–249, 258–261, (1982), *Solarvision Publications, Harrisville, NH.*

Paul D. Maycock et al., "A Guide To The Photovoltaic Revolution," pp. 154–155, 188–189, 190–191, (1985), Rodale Press, Pennsylvania.

Andrew L. Rosenthal et al., "Performance Losses in Rooftop–Mounted PV Modules from Long–Term Environmental Exposure at Las Cruces, New Mexico," NCPV Photovoltaics Program Review, Proceedings of the $15^{th}$ Conference, Sep. 1998, *AIP Conference Proceedings 462*.

Thomas Dinwoodie et al., "PowerGuard Manufacturing Innovation and Expansion," 1999, pp. 716–719, AIP Conference Proceedings Conference, AIP.

* cited by examiner

PHOTOVOLTAIC ARRAY

BACKGROUND OF THE INVENTION

1. Field of the Invention

This invention relates to a photovoltaic array including a plurality of photovoltaic modules that are mounted on a support surface such as the ground, a ground pad, or a roof, etc. for receiving sunlight to generate electricity.

2. Background Art

An important aspect of manufacturing photovoltaic arrays is the manner in which the photovoltaic modules utilized are manufactured such as disclosed by U.S. Pat. No. 5,248,349 Foote et al., U.S. Pat. No. 5,372,646 Foote et al., U.S. Pat. No. 5,470,397 Foote et al., U.S. Pat. No. 5,536,333 Foote et al., U.S. Pat. No. 5,945,163 Powell et al., and U.S. Pat. No. 6,037,241 Powell et al. In addition to the processing and apparatus utilized to manufacture the photovoltaic modules per se, the mounting and assembly of the modules into an array, which is referred to in the photovoltaic art as "balance of systems", is important. Prior art patents involving the balance of systems in the photovoltaic art include: U.S. Pat. No. 4,189,881 Hawley, U.S. Pat. No. 4,760,680 Myers, U.S. Pat. No. 4,966,631 Matlin et al., U.S. Pat. No. 5,092,939 Nath et al., U.S. Pat. No. 5,143,556 Matlin, U.S. Pat. No. 5,316,592 Dinwoodie, U.S. Pat. No. 5,505,788 Dinwoodie, U.S. Pat. No. 5,746,839 Dinwoodie, U.S. Pat. No. 6,061,978 Dinwoodie et al., U.S. Pat. No. 6,065,255 Stern et al. and German Patent Document DE 3611542 Melchoir. The aforementioned U.S. Pat. No. 5,746,839 Dinwoodie patent discloses a photovoltaic assembly having a photovoltaic module with a spacer secured to a lower surface of the module and sized and configured to define an open region beneath the lower surface and access openings formed therein for fluidly coupling the open region to the upper surface with the access openings extending along at least two sides of the photovoltaic module. The aforementioned German Patent Document DE 3611542 Melchoir discloses a photovoltaic array that is mounted on a roof and has photovoltaic modules mounted adjacent each other spaced upwardly from the roof to allow air flow below the modules.

SUMMARY OF THE INVENTION

An object of the present invention is to provide an improved photovoltaic array including a plurality of photovoltaic modules for being mounted on a support surface such as the ground, a ground pad, a roof, etc.

In carrying out the above object, the photovoltaic array of the invention includes a plurality of elongated rails for being mounted on the support surface projecting upwardly therefrom and extending in a spaced and parallel relationship to each other. Each rail has an extruded resin construction including a lower base and an upper cap that are secured to each other and cooperate to define a pair of grooves that open in opposite lateral directions from each other. The photovoltaic array also includes rectangular photovoltaic modules having edges that are received by the grooves of the rails so as to be mounted above the support surface in a spaced relationship from the support surface.

The lower base and upper cap of each rail are preferably extruded as separate pieces and secured to each other to define the oppositely opening pair of grooves.

The photovoltaic modules are preferably arranged in pairs with the modules of each pair abutting each other, and each pair of photovoltaic modules is spaced along the elongated lengths of the rails from each adjacent pair of modules to provide openings therebetween. The photovoltaic modules disclosed have elongated rectangular shapes that have lengths about twice as long as widths thereof, and each pair of photovoltaic modules has elongated edges along lengths thereof abutted with each other. Each pair of modules thus has a generally square shape extending between an associated pair of the elongated rails.

The photovoltaic array also includes cross members that extend between the lower bases of the rails to space the rails from each other. These cross members are located within openings between the photovoltaic modules. Electrical wiring of the photovoltaic array is supported by the cross members which have upwardly openings shapes that receive the electrical wiring. More specifically, the cross members have a lower floor and a pair of sides that extend upwardly from the lower floor in a converging shape toward each other and have upper edges that are spaced from each other.

As mentioned above, the elongated rails of the photovoltaic array preferably have the two piece lower base and upper cap construction. In one embodiment, each lower base includes a lower flange for mounting on the support surface, a stem that projects upwardly from the lower flange, and an upper extremity of a T shape that defines an upwardly opening slot extending along the elongated length of the elongated rail. Each upper cap has a T shape including a stem that projects downwardly and is received by the slot in the T-shaped upper extremity of the lower base. Each upper cap also has an upper cross bar that extends in opposite directions from the stem thereof to cooperate with the T-shaped upper extremity of the lower base in defining the pair of grooves that open in opposite directions from each other to receive edges of the photovoltaic modules that are mounted by the rails on the support surface.

The upper extremity of the lower base of each rail has a pair of upwardly projecting stops respectively located on opposite sides of the slot to position the modules horizontally with respect to the rails.

The elongated rails have the lower flange of the lower base provided with a greater lateral width along the elongated length thereof than the T-shaped upper extremity of the lower base and the upper cross bar of the upper cap. Also, the stem of the lower base has scallops for reducing the resin utilized.

In an alternate embodiment of the two piece rail construction, the lower base has a lower end for mounting on the support surface, a stem that projects upwardly from the lower end, an upper extremity of a T shape that defines an upwardly opening slot extending along the length of the elongated rail, and the upper extremity of the lower base includes downwardly extending flanges for securing flashing.

Fasteners secure the upper cap of the two piece rail construction to the lower base of the rail, and the upper cap includes an elongated extruded formation that facilitates centering alignment of drilled holes for receiving the fasteners.

The photovoltaic array has the lower bases and the upper caps of the two piece elongated rails extruded from a first resin and has the grooves of the rails provided with pads of a second material that is softer than the first resin to accommodate for thickness variations. More specifically, the lower base is extruded entirely from the first resin and the upper cap is coextruded from the first resin and a second resin which constitutes the second material that provides the pads which are located on the upper cross bar within the grooves.

In another embodiment of the two piece rail construction, the upwardly opening slot of the lower base and the downwardly projecting stem of the upper cap have connection formations for providing securement of the upper cap to the lower base.

The cross members of the photovoltaic array are supported by and extend between the T-shaped upper extremities of the lower bases of the rails within openings between the photovoltaic modules to space the rails from each other. These cross members have elongated shapes extruded from resin within an upwardly opening shape and, as previously mentioned, electrical wiring is received by the upwardly opening cross members.

In one use disclosed, the photovoltaic array has its support surface embodied by a roof having a membrane on which the rails are mounted. It is also possible to utilize connections that secure the lower bases of the rails to the membrane of the roof. These connections can be embodied by bonds between the lower bases of the rails and the membrane on the roof, and the bonds between the lower bases of the rails and the membrane on the roof can be autogenous. The connections can also include connector sleeves that slidably receive the lower bases of the rails, and this construction of the connections also includes bonds that secure the connector sleeves to the membrane on the roof. More specifically, the connector sleeves are made of the same material as the membrane on the roof, and the bonds between the connector sleeves and the membrane on the roof are autogenous. In another embodiment, the connections include elongated connector strips, the lower bases of the rails have openings through which the connector strips extend, and the connector strips have ends secured to the membrane on the roof. More specifically, the connector strips are made of the same material as the membrane on the roof and the ends of the connector strips have autogenous bonds that provide the securement to the membrane on the roof.

The objects, features and advantages of the present invention are readily apparent from the following detailed description of the preferred embodiments for carrying out the invention when taken in connection with the accompanying drawings.

DETAILED DESCRIPTION OF THE PREFERRED EMBODIMENTS

Figure 1:
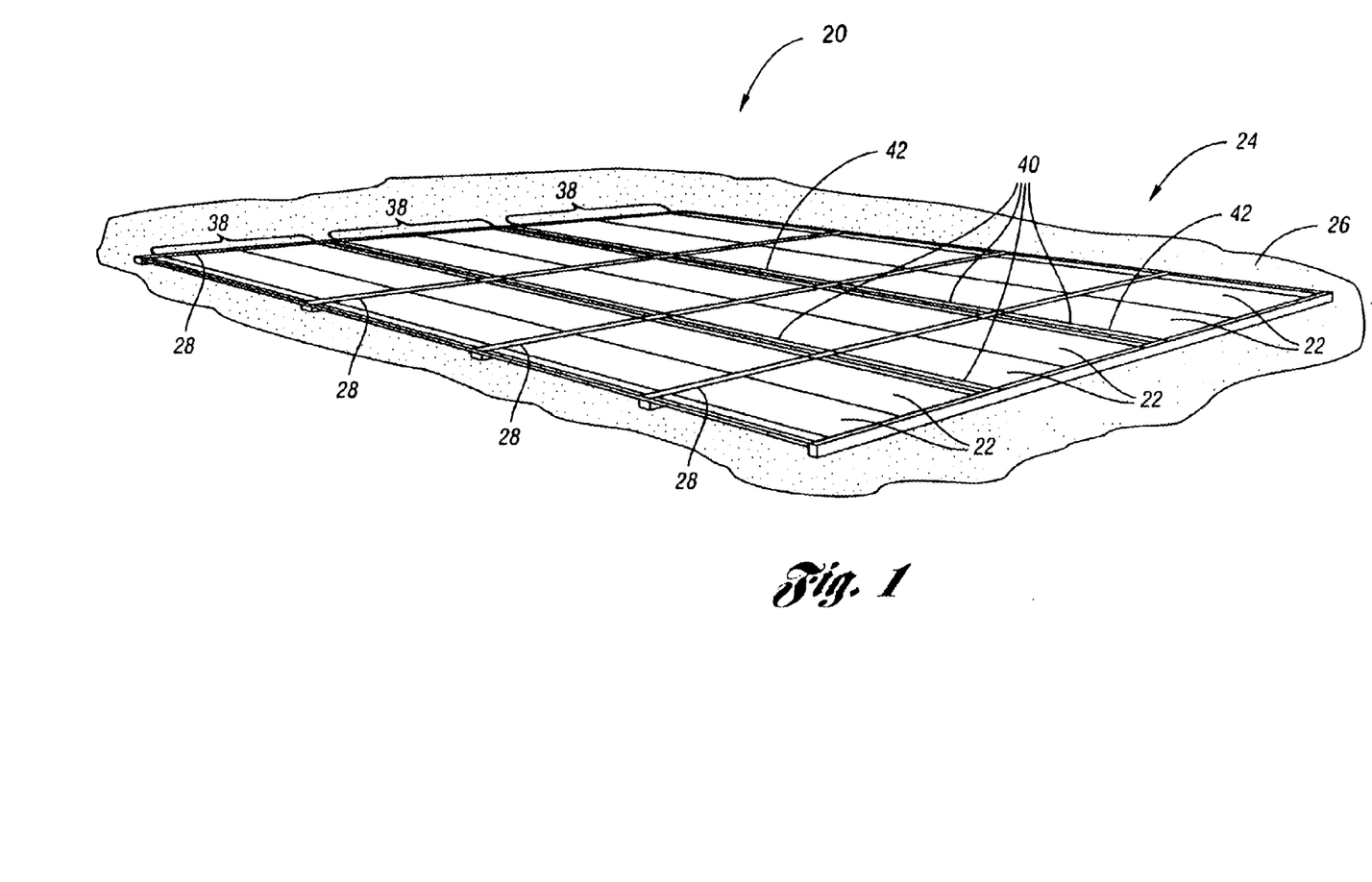
FIG. 1 is a perspective view illustrating one embodiment of a photovoltaic array constructed in accordance with the invention to include photovoltaic modules mounted on a support surface that is illustrated as being embodied by a roof.
Figure 2:
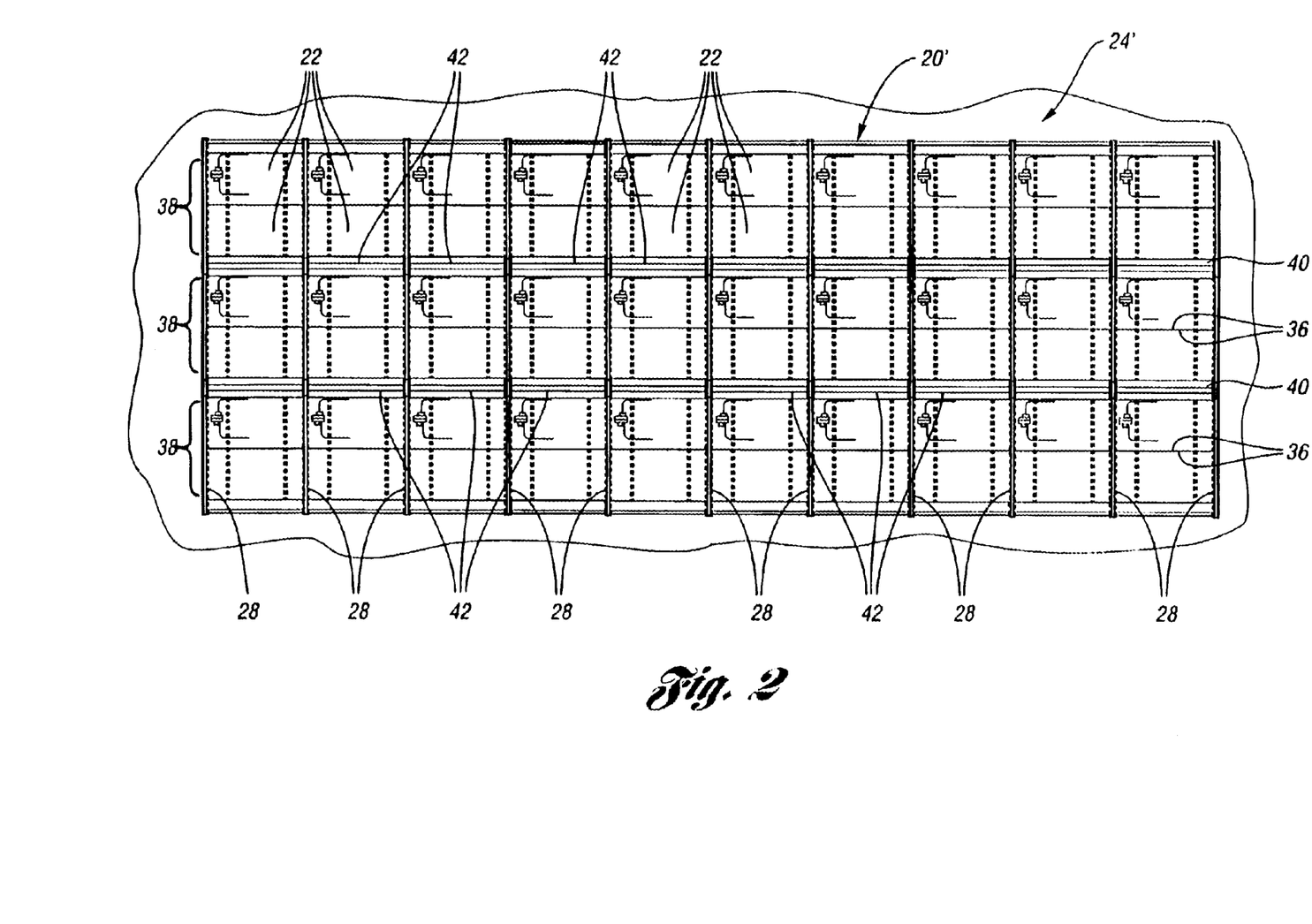
FIG. 2 is a top plan view of another embodiment of a photovoltaic array constructed in accordance with the invention but having a greater number of photovoltaic modules than the embodiment of FIG. 1.

With references to FIGS. 1 and 2, two different embodiments of a photovoltaic array constructed in accordance with the invention are respectively indicated by 20 and 20' and are the same as each other except for the number of rectangular photovoltaic modules 22 included in each array. More specifically, the photovoltaic array 20 illustrated in FIG. 1 has a six by four module size so as to include twenty four photovoltaic modules 22, while the photovoltaic array 20' of FIG. 2 has a six by ten size so as to include sixty photovoltaic modules 22. In the FIG. 1 embodiment, the photovoltaic array 20 is mounted on a support surface 24 which is embodied by a roof 26. In the embodiment of FIG. 2, the photovoltaic array 20' is mounted on a support surface 24' which may be a roof, the ground, a ground pad, or any other support surface.

Figure 4:
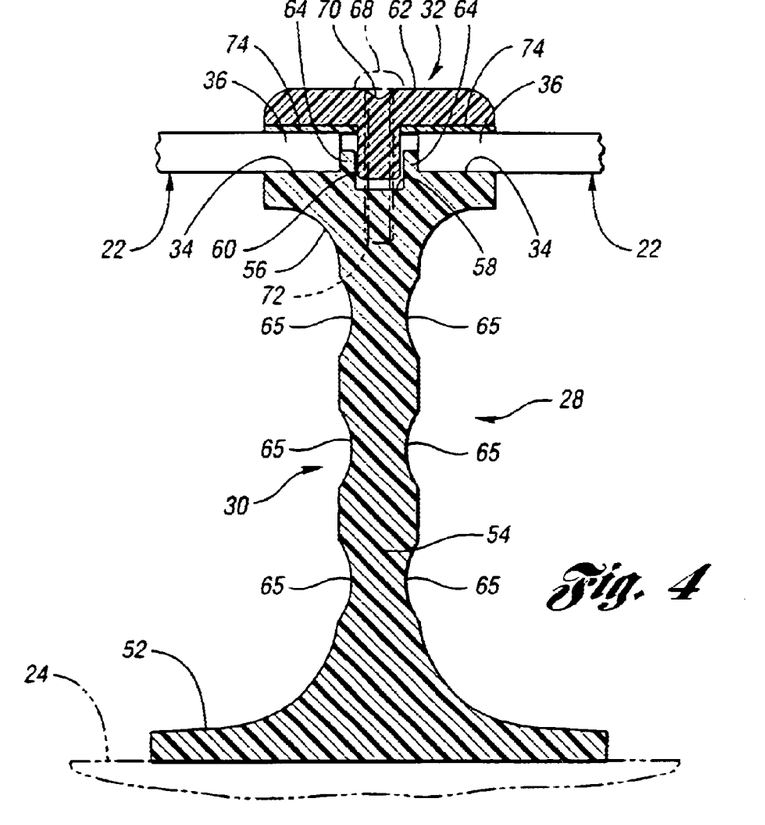
FIG. 4 is a sectional view taken along the direction of line 4—4 in FIG. 3 to illustrate the manner in which elongated rails of the photovoltaic array support photovoltaic modules by receiving their edges.

With continuing reference to FIGS. 1 and 2, each embodiment of the photovoltaic arrays 20, 20' includes a plurality of elongated rails 28 that are mounted on the associated support surface 24, 24' projecting upwardly therefrom and extending in a spaced and parallel relationship to each other. Each of the rails 28 as illustrated in FIG. 4 has an extruded resin construction including a lower base 30 and an upper cap 32 that cooperate to define a pair of grooves 34 opening in opposite directions from each other. The rectangular photovoltaic modules 22 have edges 36 that are received by the grooves 34 of the rails 28 so as to be mounted above the support surface 24 in a spaced relationship therefrom, which will nominally be about four inches, although the spacing can vary but normally will be in the range of about two to six inches.

In the preferred embodiment illustrated, the elongated rails 28 have a two piece construction with the lower base 30 and the upper cap 32 being extruded separately from each other and secured to each other to define the oppositely opening grooves 34. This two piece construction facilitates the assembly of the photovoltaic arrays by allowing the base 30 to be initially positioned on the support surface so as to receive the edges 36 of the photovoltaic modules 22 prior to securement of the caps 32 to their associated bases. While it is also possible to extrude the base 30 and cap 32 as a unitary construction, the assembly of the photovoltaic array is then somewhat more difficult to achieve since the photovoltaic modules edges must be inserted into the grooves sideways rather than being able to be placed downwardly in the manner that can be done with the two piece construction.

The photovoltaic modules 22 as shown in FIGS. 1 and 2 are preferably arranged in pairs 38 with the modules of each pair abutting each other, and with each pair 38 of photovoltaic modules being spaced along the elongated lengths of the rail from each adjacent pair to provide openings 40 therebetween. More specifically, the photovoltaic modules 22 illustrated in FIGS. 1 and 2 have elongated rectangular shapes with lengths about twice as long as their widths, nominally about four feet by two feet. Each pair 38 of the photovoltaic modules 22 has elongated edges 36 along their lengths thereof abutted with each other as illustrated so that each pair of modules has a generally square shape that will nominally be about four feet by four feet as illustrated. Thus, the short edges 36 of the module widths are received and supported by the elongated rails 28. While this is the preferred construction in providing increased size of the openings 40 for any given size of module area in order to facilitate ventilation, it should be appreciated that the photovoltaic modules can also have their shorter widths abutted and their longer lengths received by the elongated rails 28 to provide support of the modules on the support surface.

Figure 3:
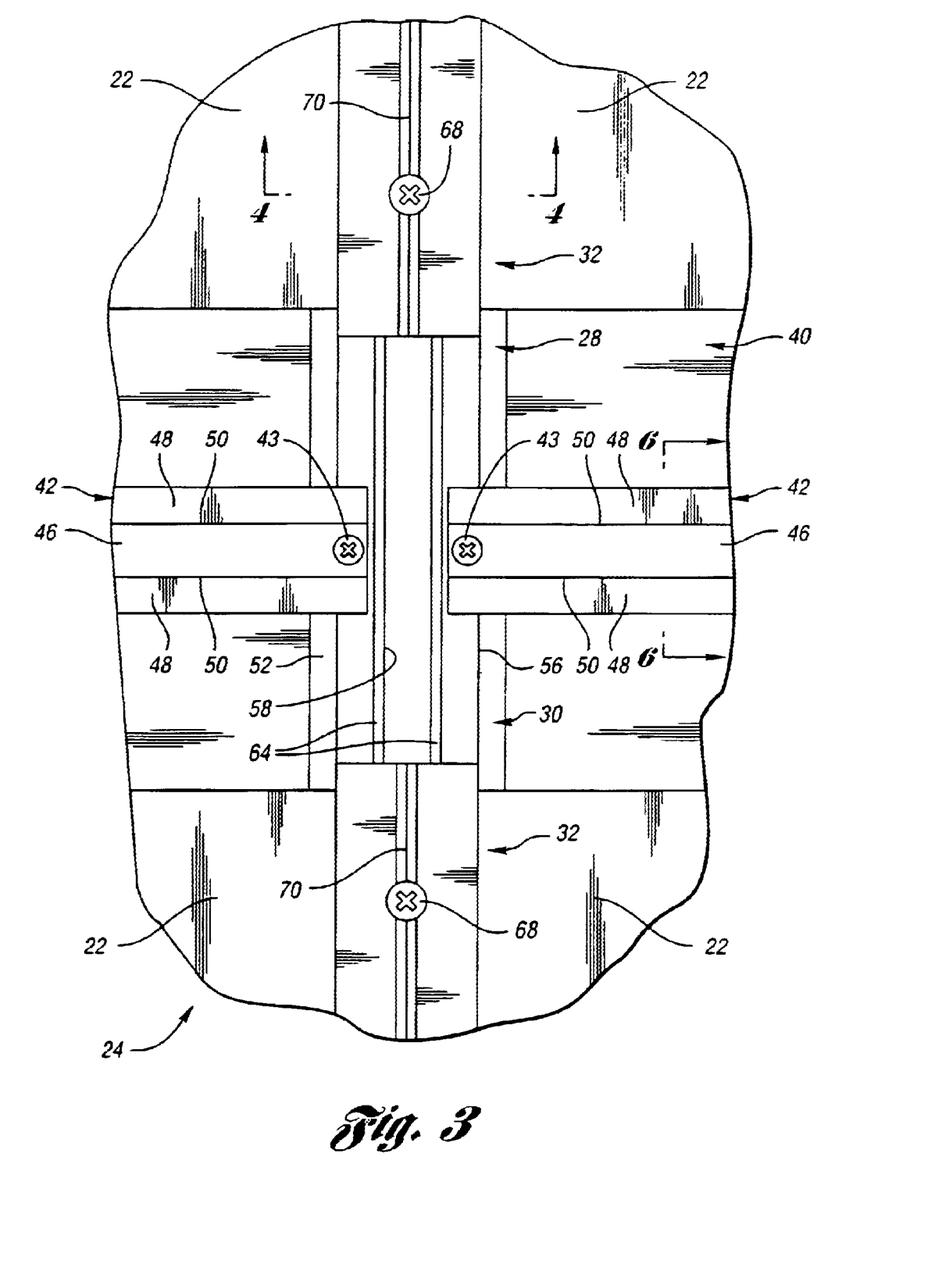
FIG. 3 is a top plan view on an enlarged scale from that shown in FIGS. 1 and 2 to illustrate the construction of the photovoltaic array.

As illustrated in FIGS. 1–3 and 5, each embodiment of the photovoltaic array includes cross members 42 that extend between the lower bases 30 of the rails 28 to space the rails from each other. The cross members 42 as best illustrated in FIG. 3 are located within the openings 40 between the photovoltaic modules 22 and are secured to the lower bases 30 by fasteners 43 such as self tapping screws as is hereinafter more fully described. Electrical wiring 44 best illustrated in FIG. 6 is supported by the cross members 42 which have upwardly opening shapes that receive the electrical wiring. More specifically, the cross members 42 as shown in FIG. 6 have a lower floor 46 and a pair of sides 48 that extend upwardly from the lower floor with an inclination in a converging shape toward each other and have upper edges 50 that are spaced from each other to permit the wiring to pass into and out of the cross members as illustrated so that all of the photovoltaic modules of the array can be connected into an appropriate circuit for collection of the electrical power generated. The inclined construction of the cross member sides 48 causes wind to provide a hold down force to the photovoltaic array.

With reference to FIG. 4, the elongated rails 28 each has the lower base 30 of its two piece construction provided with a lower flange 52 for mounting on the support surface 24, a stem 54 that projects upwardly from the lower flange 52, and an upper extremity 56 of a T shape that defines an upwardly opening slot 58 extending along the elongated length of the elongated rail.

With continuing reference to FIG. 4, the elongated rails 28 each also has the upper cap 32 of its two piece construction provided with a T shape including a stem 60 that projects downwardly and is received by the slot 58 in the T-shaped upper extremity 56 of the lower base 30. The upper cap 32 also has an upper cross bar 62 that extends in opposite directions from the stem 54 thereof to cooperate with the T-shaped upper extremity of the lower base in defining the pair of grooves 34 that open in opposite directions from each other to receive the edges 36 of the photovoltaic modules 22 that are mounted by the rails 28 on the support surface 24.

With further reference to FIG. 4, the lower base 30 of each rail 28 has a pair of upwardly projecting stops 64 located on opposite sides of the slot 58 to position the photovoltaic modules horizontally upon assembly of the photovoltaic array. More specifically, the lower base 30 is initially secured to the support surface such that the photovoltaic modules 22 can be placed downwardly thereon with the stops 64 providing horizontal positioning in a lateral direction with respect to the elongated direction of the rails. The caps 32 can then be secured to the lower bases 30 as is hereinafter more fully described to complete the assembly of the photovoltaic array in an efficient manner.

It will also be noted in FIG. 4 that the stem 54 of the lower base 30 has scallops 65 extruded along its length to reduce the amount of resin utilized. It will be further noted in FIG. 4 that the elongated rails 28 have the lower flange 52 of the lower base 30 provided with a greater lateral width along the length thereof than the T-shaped upper extremity 56 of the lower base and than the upper cross bar 62 of the upper cap 32, which provides stability in the mounting.

Figure 11:
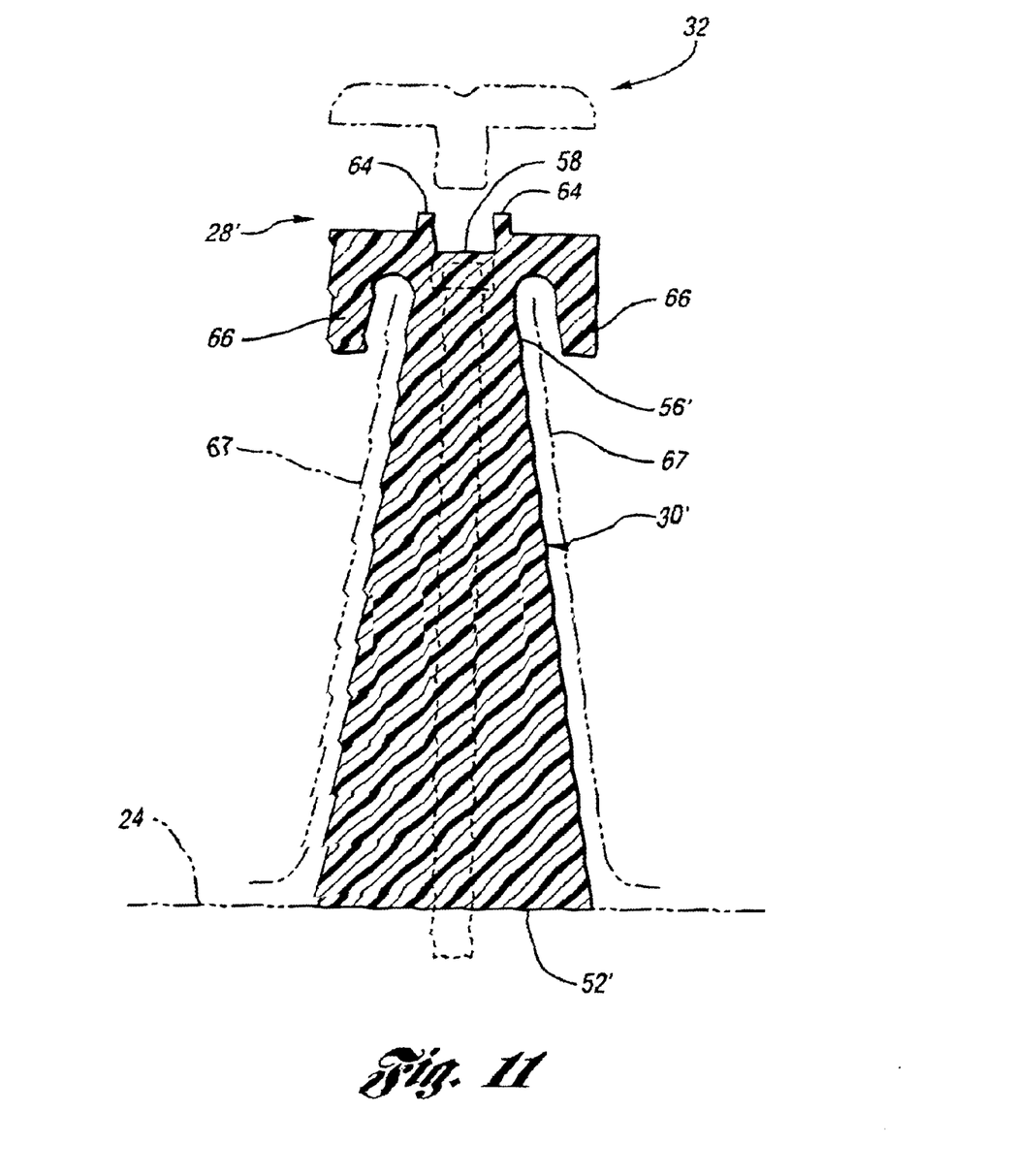
FIG. 11 is a view illustrating another embodiment of the elongated rail which has particular utility for use with steep roofs.

With reference to FIG. 11, a modified embodiment of the elongated rail 28' has a construction with particular utility for use on steep roofs. More specifically, the lower base 30' of this rail embodiment has a generally steeple shape cross section including a lower end 52' that is mounted on the support surface 24 and extends upwardly therefrom with converging shape to the upper extremity 56'. At its upper extremity 56', the lower base 30' has the same upwardly opening slot 58 as the previously described embodiment as well as having the stops 64 previously described. The lower base upper extremity 56' also has a pair of downwardly extending flanges 66 for securing flashing 67 that extends downwardly to the support surface 24 and then laterally to the adjacent rails and upwardly to thus provide an elongated weather tight seal between the rails. Screws within associated counterbored holes can be utilized to secure the lower base 30' to the support surface. The extruded cap 32 utilized with this embodiment is the same as the previously described embodiment.

As illustrated in FIGS. 3 and 4, fasteners 68 secure the upper cap 32 to the lower base 30 and will normally be embodied by suitable self tapping screws. The upper cap 32 includes an elongated extruded formation 70 along its centerline between the opposite ends of the cross bar 62. This extruded formation 70 facilitates centering alignment of drilled holes 72 (FIG. 4) for receiving the fasteners 68 which are spaced at suitable intervals along the length of the rail.

With continuing reference to FIG. 4, both the lower base 30 and the upper cap 32 of the elongated rail are extruded from a first resin such as a rigid polyvinyl chloride, and the grooves 34 of the rail include pads 74 of a second a material that is softer than the first resin to accommodate for thickness variations in the photovoltaic module edges 36 received by the grooves. More specifically, the lower base 30 is extruded entirely from the first resin and the upper cap 32 is coextruded from the first resin and a second resin such as a flexible polyvinyl chloride which constitutes the second material and provides the pads 74 which are located on the upper cross bar 62 within the grooves 34.

Figure 10:
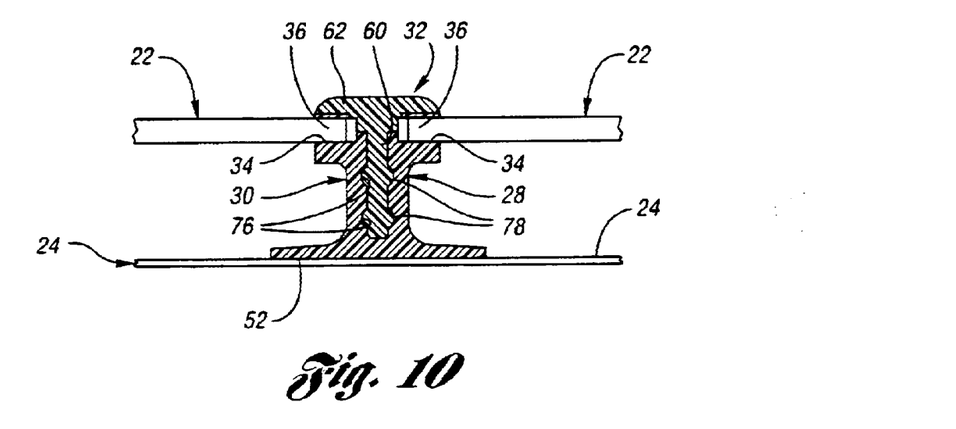
FIG. 10 is a view similar to FIG. 4 of another embodiment wherein an upper cap of the elongated rail is secured to the lower base by connection formations.

In another embodiment illustrated in FIG. 10, the rails 28 have the upwardly opening slot 58 of the lower base 30 and the downwardly projecting stem 60 of the upper cap 32 provided with connection formations 76 and 78 for providing securement of the upper cap to the lower base by a snap action.

Figure 5:
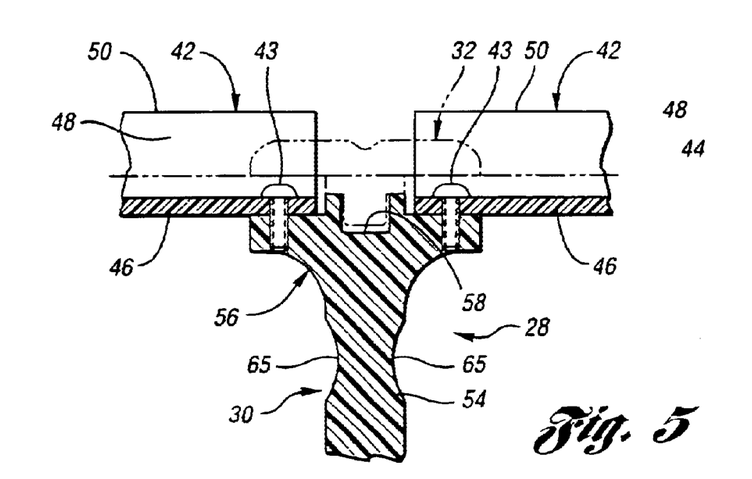
FIG. 5 is a partial sectional view taken along the direction of line 5—5 in FIG. 3 to illustrate the manner in which cross members extend between and are connected to lower bases of the elongated rails to provide spacing and support between the rails.
Figure 6:
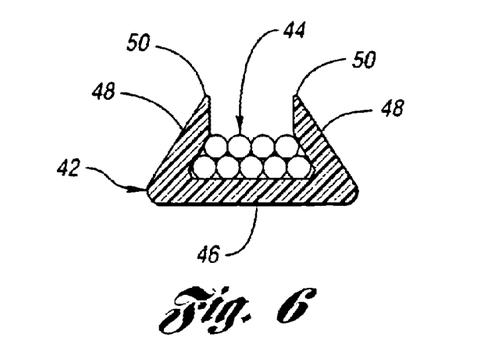
FIG. 6 is a sectional view taken along the direction of line 6—6 in FIG. 3 to illustrate the construction of the cross members.

As illustrated in FIG. 5, the cross members 42 are supported by and extend between the upper T-shaped extremities 56 of the lower bases 30 of the rails 28 and are located as shown in FIG. 3 within the openings 40 between the adjacent pairs of the photovoltaic modules 22. These cross members 42 have elongated shapes extruded from resin, such as about a rigid polyvinyl chloride, with an upwardly opening shape as previously described, and the electrical wiring 44 is received by the upwardly opening cross members as illustrated and as was previously described in connection with FIG. 6.

As shown in FIG. 5, the cross members 42 have their ends supported on and secured to the T-shaped upper extremity 56 of the lower base 30 by the fasteners 43. These cross members 42 facilitate the proper spacing of the rails 28 from each other during the assembly as well as supporting the rails in their mounted locations after the assembly.

It is also possible to use spacers within the grooves 36 of the elongated rails 28 to ensure that the pairs 38 of photovoltaic modules are properly spaced from each other. These spacers can remain as permanent components of the photovoltaic array or can be removed prior to the final securement of the upper cap 32 to the lower base 30.

The photovoltaic array in many applications may have its elongated rails 28 mounted by the associated support surface 24 without any securement or ballast required to provide a hold down function. Thus, the rail 28 illustrated in FIG. 4 may merely sit upon the support surface 24 illustrated to provide the mounting of the photovoltaic array. Connections can also be provided to secure the lower bases to the support surface.

Figure 7:
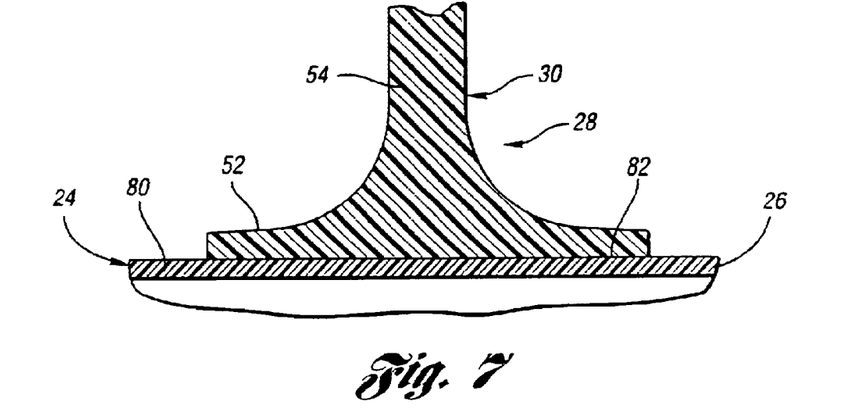
FIG. 7 is a partial view that illustrates the manner in which a lower flange of a lower base of the elongated rail may be bonded to a roof membrane.

As illustrated in FIG. 7, the support surface 24 as previously mentioned may be a roof and the roof may have a membrane 80 that can be of different materials such as polyvinyl chloride, ethylene propylene diene monomer, chlorinated polyethylene, rubber or a built-up roof (BUR) of asphalt or coal tar pitch and felt.

Figure 8:
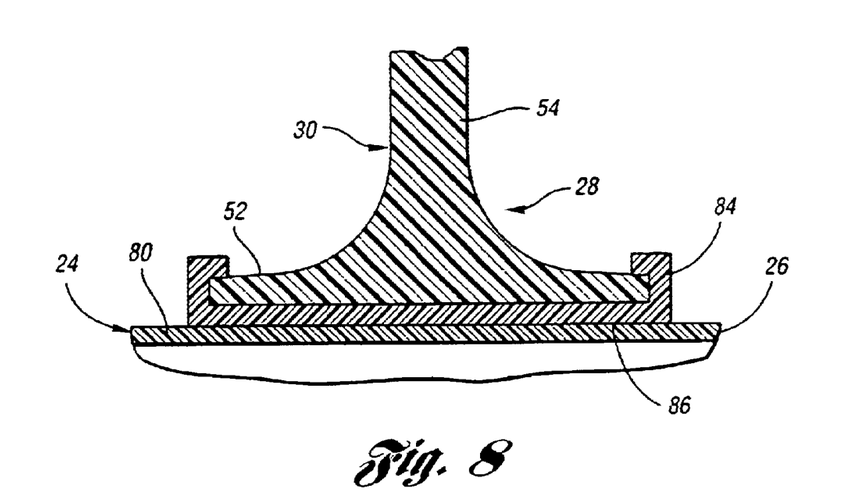
FIG. 8 is a view similar to FIG. 7 of another embodiment which includes a sleeve for securing the lower base flange to the roof membrane.
Figure 9:
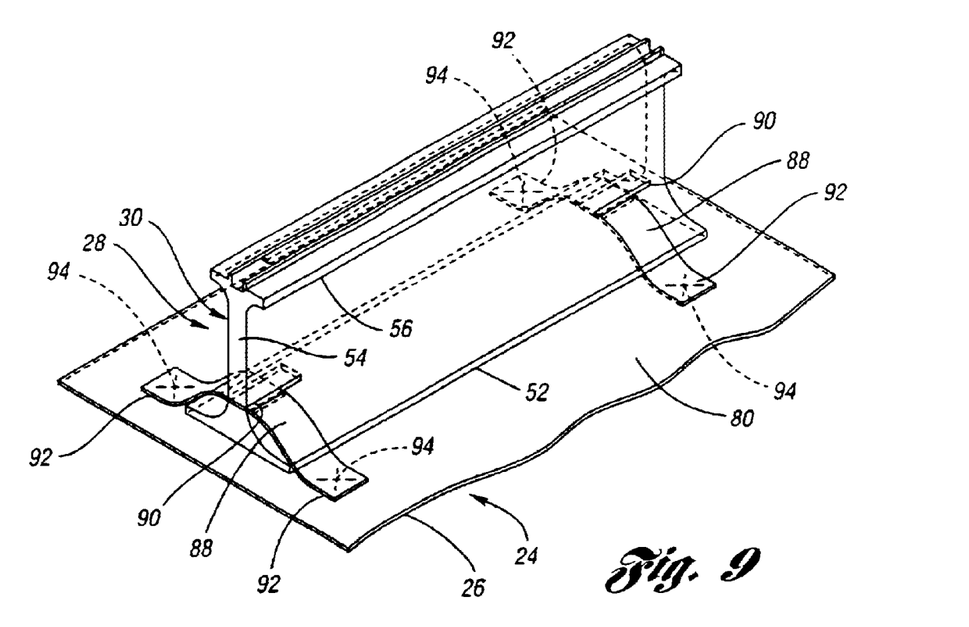
FIG. 9 is a perspective view illustrating another manner in which the lower base of the rail is secured to the roof membrane by connector strips.

As illustrated in FIGS. 7–9, the photovoltaic arrays can also have connections between the lower bases 30 of the rails and the membrane 80 of the roof. These connections can be bonds 82 between the flanges 52 of the lower bases of the rails and the membrane, with the bonds being autogenous as can be provided by heat bonding that is most easily performed when the membrane 80 is of the same material as the base. As illustrated in FIG. 8, it is also possible for the connections to be provided by connector sleeves that slidably receive the lower bases 30 of the rails such as at the lower flange 52 thereof as illustrated, and the connections include bonds 86 that secure the connector sleeves to the membrane 80 of the roof. Such bonds 86 between the connector sleeves 84 and the membrane 80 can be autogenous and provided by heat bonding that is most easily performed with the same material providing both the roof membrane and the connector sleeve.

As illustrated in FIG. 9, the connections between the rails and the roof membrane can also include connector strips 88, with the lower bases 30 of the rails 28 having openings 90 through which the connector strips extend, and the connector strips have ends 92 secured to the membrane 80 on the roof. More specifically, the connector strips 88 are made of the same material as the membrane 80 on the roof and the ends 92 of the connector strips have autogenous bonds 94 that provide the securement thereof to the roof membrane such as by heat welding.

While the preferred embodiments of the invention have been described in detail, those familiar with the art to which this invention relates will recognize various alternative designs and embodiments as defined by the following claims.

What is claimed is:

1. A photovoltaic array comprising:
    a plurality of elongated rails for being mounted on a support surface projecting upwardly therefrom and extending in a spaced and parallel relationship to each other;
    each rail having an extruded resin construction including a lower base and an upper cap that cooperate to define a pair of groove openings in opposite directions from each other; and
    rectangular photovoltaic modules having edges that are received by the grooves of the rails so as to be mounted above the support surface in a spaced relationship from the support surface, wherein a pair of the modules abut each other.

2. A photovoltaic array as in claim 1 wherein the lower base and upper cap of each rail are extruded as separate pieces and secured to each other to define the oppositely opening pair of grooves.

3. A photovoltaic array as in claim 1 wherein the photovoltaic modules are arranged in pairs with the modules of each pair abutting each other, and each pair of photovoltaic modules being spaced along the elongated lengths of the rails from each adjacent pair of modules to provide openings therebetween.

4. A photovoltaic array as in claim 3 wherein the photovoltaic modules have elongated rectangular shapes that have lengths about twice as long as widths thereof, and each pair of photovoltaic modules having elongated edges along lengths thereof abutted with each other so each pair of modules has a generally square shape.

5. A photovoltaic array as in claim 1 further including cross members that extend between the lower bases of the rails to space the rails from each other.

6. A photovoltaic array as in claim 5 wherein the cross members are located within openings between the photovoltaic modules.

7. A photovoltaic array as in claim 5 further including electrical wiring that is supported by the cross members.

8. A photovoltaic array as in claim 7 wherein the cross members have upwardly opening shapes that receive the electrical wiring.

9. A photovoltaic array as in claim 8 wherein the cross members have a lower floor and a pair of sides that extend upwardly from the lower floor in a converging shape toward each other and have upper edges that are spaced from each other.

10. A photovoltaic array as in claim 1 wherein the lower base and upper cap of each rail are extruded as separate pieces and secured to each other to define the oppositely opening pair of grooves; each lower base including a lower flange for mounting on the surface, a stem that projects upwardly from the lower flange, and an upper extremity of a T shape that defines an upwardly opening slot extending along the elongated length of the elongated rail, and each upper cap having a T shape including a stem that projects downwardly and is received by the slot in the T-shaped upper extremity of the lower base, and each upper cap having an upper cross bar that extends in opposite directions from the stem thereof to cooperate with the T-shaped upper extremity of the lower base in defining the pair of grooves that open in opposite directions from each other to receive the edges of the photovoltaic modules that are mounted by the rails on the support surface.

11. A photovoltaic array as in claim 10 wherein the upper extremity of the lower base of each rail has a pair of upwardly projecting stops respectively located on opposite sides of the slot to position the modules horizontally with respect to the rails.

12. A photovoltaic array as in claim 8 wherein the elongated rails have a lower flange of the lower base provided with a greater lateral width along the elongated length thereof than a T-shaped upper extremity of the lower base and than a upper cross bar of the upper cap.

13. A photovoltaic array as in claim 8 wherein a stem of the lower base has scallops for reducing the resin utilized.

14. A photovoltaic array as in claim 1 wherein the lower base and upper cap of each rail are extruded as separate pieces and secured to each other to define the oppositely opening pair of grooves, each base including a lower end for mounting on the support surface, a stem that projects upwardly from the lower end, an upper extremity of a T shape that defines an upwardly opening slot extending along the elongated length of the elongated rail and the upper extremity of the lower base including downwardly extending flanges for securing flashing; and each upper cap having a T shape including a stem that projects downwardly and is received by the slot in the T-shaped upper extremity of the lower base, and each upper cap having an upper cross bar that extends in opposite directions from the stem thereof to cooperate with the T-shaped upper extremity of the lower base in defining the pair of grooves that open in opposite directions from each other to receive the edges of the photovoltaic modules that are mounted by the rails on the support surface.

15. A photovoltaic array as in claim 10 or 14 further including fasteners for securing the upper cap to the lower base.

16. A photovoltaic array as in claim 15 wherein the upper cap includes an elongated extruded formation that facilitates centering alignment of drilled holes for receiving the fasteners.

17. A photovoltaic array as in claim 10 or 14 wherein the lower bases and upper caps of the elongated rails are extruded from a first resin and wherein the grooves of the rails include pads of a second material that is softer than the first resin to accommodate for thickness variations in the photovoltaic module edges received by the grooves.

18. A photovoltaic array as in claim 17 wherein the lower base is extruded entirely from the first resin and wherein the upper cap is coextruded from the first resin and a second resin which constitutes the second material provides the pads which are located on the upper cross bar within the grooves.

19. A photovoltaic array as in claim 10 wherein the upwardly opening slot of the lower base and the downwardly projecting stem of the upper cap have connection formations for providing securement of the upper cap to the lower base.

20. A photovoltaic array as in claim 10 or 14 further including cross members that are supported by and extend between the T-shaped upper extremities of the lower bases of the rails within openings between the photovoltaic modules to space the rails from each other.

21. A photovoltaic array as in claim 20 wherein the cross members have elongated shapes extruded from resin with an upwardly opening shape, and electrical wiring is received by the upwardly opening cross members.

22. A photovoltaic array as in claim 1 wherein the support surface is a roof having a membrane on which the rails are mounted.

23. A roof photovoltaic array as in claim 22 further including connections that secure the lower bases of the rails to the membrane on the roof.

24. A roof photovoltaic array as in claim 23 wherein connections include elongated connector strips, the lower bases of the rails have openings through which the connector strips extend, and the connector strips have ends secured to the membrane on the roof.

25. A photovoltaic array comprising:
a plurality of elongated rails for being mounted on a support surface projecting upwardly therefrom and extending in a spaced and parallel relationship to each other;
each rail having an extruded resin construction including a lower base and an upper cap that are secured to each other and cooperate to define a pair of grooves that open in opposite directions from each other;
the lower base including a lower flange for mounting on the support surface, a stem that projects upwardly from the lower flange, and an upper extremity of a T shape that cooperates with the stem to define an upwardly opening slot extending along the elongated length of the elongated rail;
the upper cap having a T shape including a stem that projects downwardly and is received by the slot in the upper extremity of the lower base, and the upper cap having an upper cross bar that extends in opposite directions from the stem thereof to cooperate with the T-shaped upper extremity of the lower base in defining the pair of grooves that open in opposite directions from each other;
rectangular photovoltaic modules having edges that are received by the grooves of the rails so as to be mounted above the support surface in a spaced relationship therefrom, the photovoltaic modules being arranged in pairs with the modules of each pair abutting each other, and each pair of photovoltaic modules being spaced along the elongated lengths of the rails from each adjacent pair of modules to provide openings therebetween; and
cross members that extend between the lower bases of the photovoltaic modules to space the rails from each other, and the cross members being located within the openings between adjacent pairs of the modules.

26. A photovoltaic array comprising:
a plurality of elongated rails for being mounted on a support surface projecting upwardly therefrom and extending in a spaced and parallel relationship to each other;
each rail having an extruded resin construction including a lower base and an upper cap that are secured to each other and cooperate to define a pair of grooves that open in opposite directions from each other;
the lower base including a lower flange for mounting on the support surface, a stem that projects upwardly from the lower flange, and an upper extremity of a T shape that cooperates with the stem to define an upwardly opening slot extending along the elongated length of the elongated rail, and the T-shaped upper extremity having a pair of upwardly projecting stops respectively located on opposite sides of the slot;
the upper cap having a T shape including a stem that projects downwardly and is received by the slot in the upper extremity of the lower base, the upper cap having an upper cross bar that extends in opposite directions from the stem thereof to cooperate with the T-shaped upper extremity of the lower base in defining the pair of grooves that open in opposite directions from each other;
rectangular photovoltaic modules having edges that are received by the grooves of the rails so as to be mounted above the support surface in a spaced relationship therefrom, the photovoltaic modules being arranged in pairs with the modules of each pair abutting each other, and each pair of photovoltaic modules being spaced along the elongated lengths of the rails from each adjacent pair of modules to provide openings therebetween; and
cross members that are supported by and extend between the T-shaped upper extremities of the lower bases of the photovoltaic modules to space the rails from each other, and the cross members being located within the openings between adjacent pairs of-the modules.

27. A photovoltaic array comprising:

a plurality of elongated rails for being mounted on a support surface projecting upwardly therefrom and extending in a spaced and parallel relationship to each other;

each rail having an extruded resin construction including a lower base and an upper cap that are secured to each other and cooperate to define a pair of grooves that open in opposite directions from each other;

the lower base being extruded entirely from a first resin and including a lower flange for mounting on the support surface, a stem that projects upwardly from the lower flange, and an upper extremity of a T shape that cooperates with the stem to define an upwardly opening slot extending along the elongated length of the elongated rail, and the T-shaped upper extremity having a pair of upwardly projecting stops respectively located on opposite sides of the slot;

the upper cap having a T shape including a stem that projects downwardly and is received by the slot in the upper extremity of the lower base, the upper cap having an upper cross bar that extends in opposite directions from the stem thereof to cooperate with the T-shaped upper extremity of the lower base in defining the pair of grooves that open in opposite directions from each other, and the upper cap being coextruded from the first resin and the second resin that is softer than the first resin and providing pads on the upper cross bar within the grooves;

rectangular photovoltaic modules having edges that are received by the grooves of the rails so as to be mounted above the support surface in a spaced relationship therefrom, the photovoltaic modules being arranged in pairs with the modules of each pair abutting each other, and each pair of photovoltaic modules being space along the elongated lengths of the rails from each adjacent pair of modules to provide openings therebetween; and cross members that are supported by and extend between the T-shaped upper extremities of the lower bases of the photovoltaic modules to space the rails from each other, the cross members being located within the openings between adjacent pairs of the modules, the cross members having upwardly opening shapes, and electrical wiring received by the cross members.

\* \* \* \* \*